(12) United States Patent
Dolan et al.

(10) Patent No.: US 6,377,572 B1
(45) Date of Patent: Apr. 23, 2002

(54) VIRTUAL RESOURCE ALLOCATION METHOD AND APPARATUS FOR WIRELESS DATA COMMUNICATION SYSTEMS

(75) Inventors: Michael F. Dolan, Bolingbrook; Chung-Zin Liu, Naperville, both of IL (US); Harvey Rubin, Morristown, NJ (US); Kenneth Wayne Strom, Naperville, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/080,769

(22) Filed: May 18, 1998

(51) Int. Cl.[7] .......................... H04L 12/58; H04L 12/64; H04L 12/66
(52) U.S. Cl. ...................... 370/355; 370/328; 370/357; 370/397; 370/410; 370/913; 709/224; 709/226; 709/227; 709/238
(58) Field of Search ................................. 370/238, 328, 370/351, 355, 357, 912, 913, 397, 410, 310.1, 310.2, 395.1, 396, 400, 329, 352, 389, 395.2, 395.3; 709/223, 224, 226, 227, 228, 238

(56) References Cited

U.S. PATENT DOCUMENTS

| 5,265,091 A | * | 11/1993 | van Landegem | 370/60 |
| 5,521,591 A | * | 5/1996 | Arora et al. | 340/826 |
| 5,719,863 A | * | 2/1998 | Hummel | 370/392 |
| 5,790,173 A | * | 8/1998 | Strauss et al. | 348/7 |
| 5,856,981 A | * | 1/1999 | Voelker | 371/20.1 |
| 5,889,769 A | * | 3/1999 | Mizuno | 370/328 |
| 6,011,780 A | * | 1/2000 | Vaman et al. | 370/237 |
| 6,092,113 A | * | 7/2000 | Maeshima et al. | 709/230 |
| 6,108,304 A | * | 8/2000 | Abe et al. | 370/232 |
| 6,111,673 A | * | 8/2000 | Chang et al. | 359/123 |
| 6,147,991 A | * | 11/2000 | Rogers | 370/389 |
| 6,151,324 A | * | 11/2000 | Belser et al. | 370/397 |
| 6,219,355 B1 | * | 4/2001 | Brodigan | 370/486 |
| 6,275,493 B1 | * | 8/2001 | Morris et al. | 370/395 |

* cited by examiner

*Primary Examiner*—Hassan Kizou
*Assistant Examiner*—Joe Logsdon
(74) *Attorney, Agent, or Firm*—Grossman, Patti & Brill (57) ABSTRACT

A system includes a first virtual end point processor (332) operably coupled to a plurality of channel elements (304) and a second virtual end point processor (340) operably coupled to a plurality of frame selectors (314). The system also includes at least one signaling manager (318, 334) that is arranged and constructed to establish a communication path that terminates at the first virtual end point processor (332) and the second virtual end point processor (340) prior to receiving a request for resources for a data call, such that set-up time for the data call through a wireless network is reduced.

21 Claims, 6 Drawing Sheets

VIRTUAL RESOURCE ALLOCATION METHOD AND APPARATUS FOR WIRELESS DATA COMMUNICATION SYSTEMS

BACKGROUND OF THE INVENTION

Cellular communication networks are nearly ubiquitous, providing reliable two-way voice communications. More recently, cellular communication networks are being used to provide data communications as well.

Reliably sending data over a wireless communication network presents technical challenges because of the very nature of data transmission. By its very nature, data (as opposed to voice signals and digitized representations of voice) is typically generated and sent intermittently, characteristically sent in bursts or packets. Reliably transmitting bursts of high-speed data through a communications network requires that a path exist through the network to avoid data loss.

In a wireless CDMA communications system, an encoded data packet is transmitted by a CDMA radio every twenty milliseconds. These digitally encoded signals broadcast from a mobile radio are usually received by more than one cell site base station receiver. The data packets that are picked up at the cell sites that hear the signal from the mobile radio are routed to circuits known as channel elements within the cell site equipment. Cell sites that hear the CDMA mobile forward the received data packets from the channel elements to other circuits known as frame selectors via a switching network linking the cell sites to the frame selector circuits centrally located in a selector distribution unit or SDU. In many instances, the switching network linking cell sites to a selector distribution unit is an asynchronous transfer mode (ATM) switching system.

Frame selector units in the SDUs evaluate the several different CDMA samples received from the cell sites and select a particular CDMA sample of those "heard" by the various cell sites based upon a determination of which sample has the best (most error-free) data. Every twenty milliseconds the CDMA samples from a mobile unit are re-evaluated so that the best data signal is used to reconstruct the original signal.

The frame selector units and especially the channel elements are relatively scarce resources in a typical wireless system. For a voice call, a channel element at a cell site is allocated to the mobile call for the duration of that call on that cell. Likewise for the frame selector in the SDU and the transmission path between the allocated channel element and frame selector. For a data call however, more than one channel element at a cell site may be assigned to the mobile data call when it is necessary to transfer a burst of data. It is advantageous to share the channel elements at a cell site among several mobile data calls that intermittently have bursts of data to transfer but are otherwise not transferring data. This sharing of channel elements necessitates the establishment of different communication paths between the set of channel elements at cell sites and the set of frame selectors at one or more SDUs.

A problem with sending high-speed data through a CDMA communications system is that the path between the channel elements and the frame selectors through a switching network always requires a finite amount of time to set up. Bursts of high-speed data can be lost or, the service quality level can deteriorate because of the time required to set up a path through a switching network.

Lost data packets can be catastrophic to data message integrity. A CDMA wireless communication system that prevents burst data losses would be an improvement over the prior art. A CDMA wireless communication system that is able to quickly establish needed communication paths can provide improved service over the prior art.

SUMMARY OF THE INVENTION

New functionality provided to CDMA cell sites and CDMA SDUs reduces call set up time and improves high-speed data handling through a CDMA network. This new functionality is provided by way of computers and computer programs that establish and maintain communication links through a switching network linking the cell sites to the SDUs. These computers and computer programs include virtual end point processors in both the cell site and SDU that together establish one or more communication paths through the switching network. Signaling manager computers and software coordinate the creation and maintenance of logical communication paths. Call manager computer and/or software is responsible for coordination of activities relative to each call. Such a call manager is commonly embodied in a base station controller.

In the preferred embodiment, the CDMA cell site virtual end point processor is controlled by the cell site signaling manager, to establish and maintain a communication link through an ATM switching network linking the cell site to an SDU. The cell site virtual end point processor communicates through the ATM network with a virtual end point processor within the CDMA SDU that is under the direction and control of an SDU signaling manager. When an actual call must be routed from the cell site to the SDU, the call manager communicates with the cell site signaling manager. The cell site signaling manager dynamically assigns channel elements and couples data signals from a CDMA mobile radio seeking communication privileges to that CDMA cell site channel element. The cell site signaling manager arranges with its counterpart in the SDU to couple the frame selector for the radio channel to the previously established ATM network communication path, and then couples the CDMA channel element to the previously-established ATM network communication path via the cell site virtual end point processor. The SDU signaling manager couples the allocated frame selector to the previously established ATM network communication path.

DETAILED DESCRIPTION OF THE PREFERRED EMBODIMENT

Figure 1:
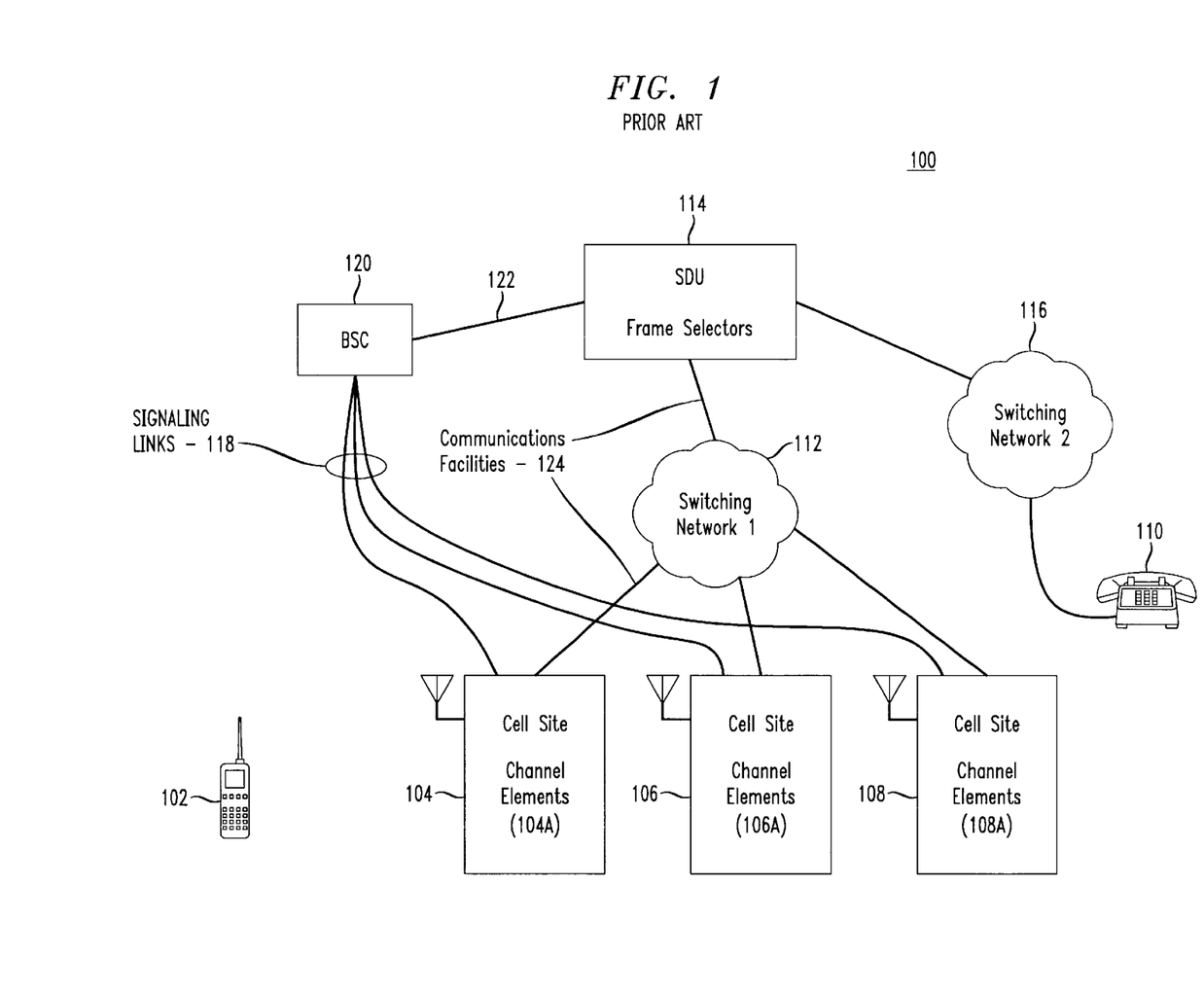
FIG. 1 shows a simplified block diagram of a prior art CDMA wireless communication system that includes: a base station controller; a selector distribution unit (SDU) having frame selectors; three cell sites with channel elements and a switching network linking the cell sites to the SDU.
Figure 3:
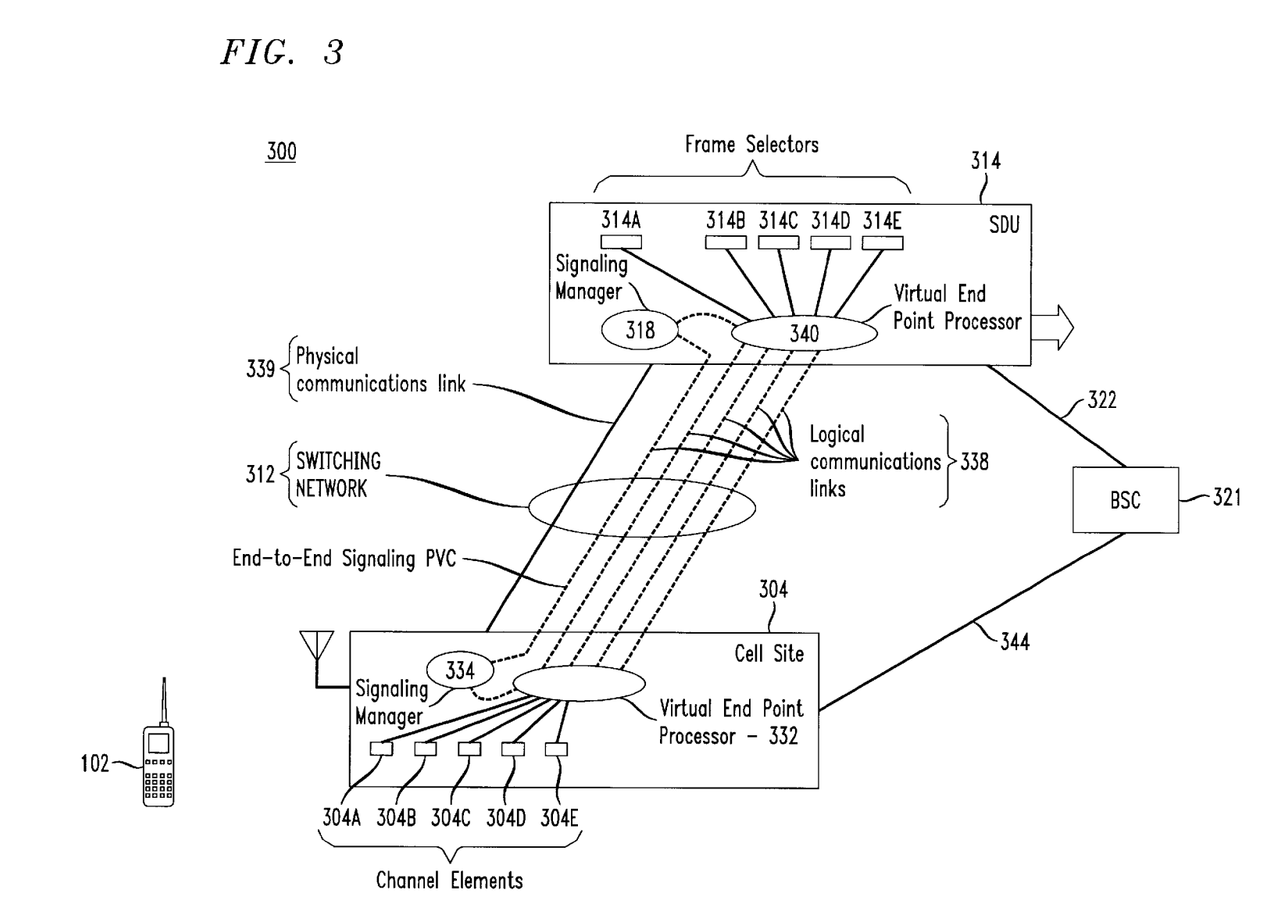
FIG. 3 shows a simplified block diagram of the preferred embodiment of a CDMA wireless communication system for handling high-speed data.

For purposes of better understanding the preferred embodiment that is described hereinafter in FIG. 3, FIG. 1 shows a simplified block diagram of a prior art CDMA wireless communication system (100). A CDMA mobile (102) sends and receives radio frequency signals to and from CDMA cell sites (104, 106, 108) that include CDMA channel elements.

The channel elements (104A, 106A, 108A) are typically digital signal processing elements, such as well-known digital signal processors or DSPs or Application Specific Integrated Circuits or (ASICs) that transform base band user data signals to and from the high-rate spread spectrum digital signal specified in CDMA standards. In the direction out to the mobile (102), the high rate spread spectrum signal generated by the channel element (104A, 106A, 108A) is used to modulate the RF carrier transmitted to the mobile unit (102). In the direction from the mobile (102), RF signals from the mobile are demodulated at the cell site (104, 106, 108) to produce the high rate spread spectrum signal that is input to a channel element (104A, 106A, 108A) to derive the user base band digital signal.

In a CDMA wireless communication system, it is commonplace for several cell sites to "hear" the same mobile (102), however, one cell site will always be able to hear the mobile radio better than the others and therefore have higher-quality signals from the mobile. Selecting the cell site with the best signals from the mobile is performed at a centrally located selector distribution unit (114) of the CDMA system (100) as set forth below.

Cell sites (104, 106, 108) that provide the radio frequency link to the mobile (102) are distributed throughout a geographic area. Routing a call between the mobile (102) and another party (110) requires that the cell sites (104, 106, 108) themselves be linked through an optional switching network (112) to the aforementioned selector distribution unit or "SDU" (114). The SDU (114) contains CDMA frame selector circuits (not shown) the function of which is to identify and select which cell site (104, 106, 108) has the best data samples from the mobile (102). CDMA samples from all cell sites that "hear" the mobile (102) are sent to the SDU (114) where each of the samples is evaluated by frame selector circuits. When the best cell site (104, 106, 108) signal has been selected by a frame selector within the SDU (114), the selected data signal is eventually routed to a destination (110), typically through another switching network such as the public switched telephone network or "PSTN" (116) as it is known. Alternatively, the selected data signal could be routed to a packet data network through a CDMA telecommunications network interworking function (IWF) (not shown), as it is known in the art.

Signaling links (118) couple the base station controller (120) to each of the cell sites (104, 106, 108) allowing the base station controller (120) to control the resources of the cell sites in support of calls. A signaling link (122) coupling the base station controller (120) to the SDU (114) allows the base station controller to control SDU resources in support of calls. Communications facilities (124) provide signaling and voice and data transport between the SDU (114) and the cell sites (104, 106, 108).

In the prior art, when a call is established, both a channel element in each needed cell site and a frame selector in an SDU are functionally and statically allocated to the call. Frame selector allocation is static, i.e. a frame selector is allocated to a call for the duration of time that a call is within a particular SDU. A communications path is established between each channel element and the frame selector through a possibly intervening network, an ATM network for example. The mobile base band digital signal is transferred across this path in each direction each twenty milliseconds (20 msec.). For a high speed data call, a multiplicity of channel elements may be required to carry the user data bursts, thereby requiring a multiplicity of channel elements to be connected via a multiplicity of communication paths through the intervening network to the frame selectors. Prior art methodologies may allocate channel elements and frame selectors to the call for the duration of the call. Such an arrangement is very wasteful of channel element resources and may not allow a large number of mobile data calls to be processed by a cell site, because during most time intervals, no data is being transferred to or from the mobile. Such behavior is due to the known bursty nature of data calls.

Cell site channel elements are used more efficiently if they can be allocated to a data call only when there is a need to transfer data on behalf of the data call. One way to accomplish this type of system behavior it to establish communication paths through the intervening network (the ATM network for example) between channel elements in a cell site and an appropriate frame selector when data transfer is required for a data call. The communication path through the intervening network is disconnected when there is no need to transfer data required for the data call. De-allocated channel elements can thereafter be assigned temporarily to another data call being processed at the cell site. This allows for efficient utilization of channel elements and allows the cell site to provide service to more data calls with a specific number of equipped channel elements, however, the service provided to each data call will be of moderate to low quality owing to the time required to establish connections through the back end network once it is determined that a data burst is required for a data call. Also, owing to this delay before a data burst can be handled, user data may over-run available buffers in the wireless system or in the mobile thereby causing lost data, a serious system service degradation.

The approach disclosed herein advantageously allows for the efficient utilization of the channel element resources while eliminating most of the delay associated with establishing the communications path between the channel elements and the frame selectors when it is required to transfer a burst of data for a data call. Frame selectors and channel elements are associated during a data burst with an appropriate set of preestablished communication paths and are alternately allocated to other communications paths or remain idle when a data burst ends under the control of and at the discretion of the wireless system.

Figure 2:
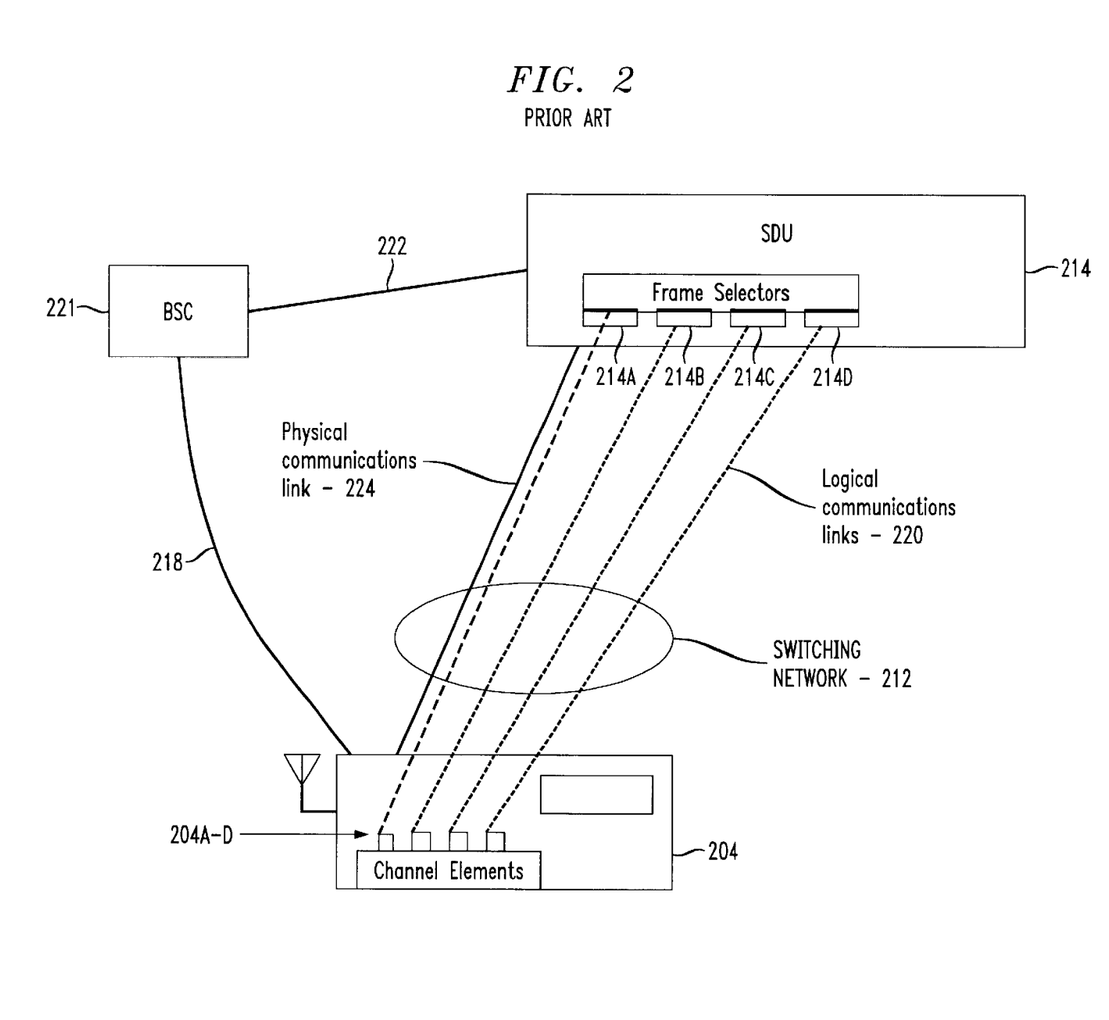
FIG. 2 shows a simplified block diagram of the constituent elements of a prior art CDMA cell site having CDMA channel elements and a prior art CDMA SDU with CDMA frame selectors.

FIG. 2 shows a more detailed representation of a prior art CDMA cell site 204 and four (4) included cell site channel elements (204A, 204B, 204C, 204D). Physical communications links (224) that are typically ATM circuits through an ATM network (212) carry CDMA data between the cell site channel elements (204A, 204B, 204C, 204D) and SDU (214) frame selectors (214A, 214B, 214C, 214D). Each channel element (204A, 204B, 204C, 204D) and each frame selector (214A, 214B, 214C, 214D) pairing uses a logical communication path (220) that is in reality a path through the ATM network (212). A base station controller (224) communicates across signaling links (218, 222) for purposes of controlling network resource allocation to support calls. Those skilled in the art will recognize that FIGS. 1 and 2 depict only a single cell site coupled to an SDU. Actual embodiments would of course allow multiple cell sites to be attached to the same frame selectors within an SDU.

In the prior art embodiments depicted in FIGS. 1 and 2, setting up a path through the ATM network linking the cell sites and the SDU requires time that is preferably avoided to help insure accurate high-speed data transfer. Transmission path set up time is significantly reduced using the wireless communication network depicted in FIG. 3, which shows the preferred embodiment of the invention In the CDMA wireless communication system shown in FIG. 3, (300), the cell sites (one shown as element 304) are provided with virtual end point processors (332) and signaling manager (334) that provide new functionality to prior art CDMA cell sites (104, 204). The cell site virtual end point processor (332) and the SDU virtual end point processor (340) in the preferred embodiment are each one or more computers and included software that sets up and maintains communication paths through the switching network (312) linking the cell site (304) to one or more SDU (314). The virtual end point processor (332) in the cell site serves as the termination of one or more communication paths that need to be established over physical circuits (339) connecting the cell site (304) to the network (312) that couples the cell site (304) to the SDUs (314). These physical communication paths (339) convey the data bursts associated with data calls. Upon initialization, or under the direction of a controller such as the signaling manager (318, 334), the cell site virtual end point processor establishes one or more logical communication paths (338) via one or more physical communication paths (339) that terminate on its counterpart, i.e. the SDU virtual end point processor. The cell site virtual end point processor conveys to the corresponding SDU virtual end point processor a common reference, i.e. an identifier, used to identify each communication path established between the virtual end point processors (332 and 340).

When the base station controller (321) decides that a communication path needs to be set up between a channel element and a frame selector, the base station controller (BSC) (321) communicates with the cell site signaling manager (334) over a communications link (344). The BSC also communicates with the SDU (314) over a signaling link (322). The cell site signaling manager (334) communicates with the cell site virtual end point processor (332). The cell site virtual end point processor establishes a cell site-internal data route between the allocated channel element and the allocated communication path. After the data burst has been transported between the cell site and SDU, the cell site virtual end point processor establishes the cell site internal data routing for the allocated communications path to be once again to itself. No more data is transferred from the channel element to the communication path. The previously allocated channel element is now available to be assigned to serve another data (or voice) call.

The cell site virtual end point processor can have several embodiments. In one embodiment, the cell site virtual end point processor is a software program the executes on a processor at the cell site, managing the physical communications facilities at the cell site, and routing traffic that is transferred between these facilities and other components within the cell site. In this embodiment, the cell site virtual end point processor might be an extension of the software processing capabilities of the existing cell site hardware and software. Those skilled in the art will understand that this embodiment and other embodiments of the virtual end point processor (332) could of course include logic and other circuits to switch or route data between the channel elements and the intervening switching network (312).

Within the cell site, a new signaling manager (334) manages and controls logical communication path (338) assignments through the switching network (312). The signaling manager controls which channel element (304A–304E) is coupled to a particular path set up and maintained through the switching network (312) by the virtual end point processors (332) in order to route a call to the SDU (314).

Within the SDU (314) are a new signaling manager (318) and a SDU virtual end point processor (340) that mirrors the functionality of the cell site virtual end point processor.

The virtual end point processor in the SDU (340) serves as the terminus of one or more communications paths (338) that need to be established over the physical interface (339) connecting the SDU to the network (312) that connects the SDU (314) to the cell sites (304). The physical communication paths (339) convey the data bursts associated with data calls. The SDU virtual end point processor (340) is preferably always ready at any point in time to accept the establishment of communications paths from any cell site in the wireless system (300). The SDU virtual end point processor (340) receives data from the cell site (304) that is a reference for each communications path (338) established. It (340) also keeps a record of the references, and also passes the references to other SDU software, such as the SDU signaling manager (318).

During the time when a pre-established communications path needs to be set up between a channel element (304A, 304B, 304C, 304D) and a frame selector (314A, 314B, 314C, 314D, 314E) the SDU virtual end point processor (340) establishes an SDU-internal data route between an allocated frame selector (314A, 314B, 314C, 314D, 314E) and an allocated communications path (338 via a physical link 339). After the need to communicate a data burst for a specific call ends, the SDU virtual end point processor (340) establishes the SDU internal routing of data for the allocated communications path to be once again on itself releasing the previously established path for use on another call. The previously allocated frame selector (314A, 314B, 314C, 314D, 314E) can be re-assigned to serve another data (or voice) call, or may remain assigned to the preceding call, at the discretion of the wireless system.

Figure 4:
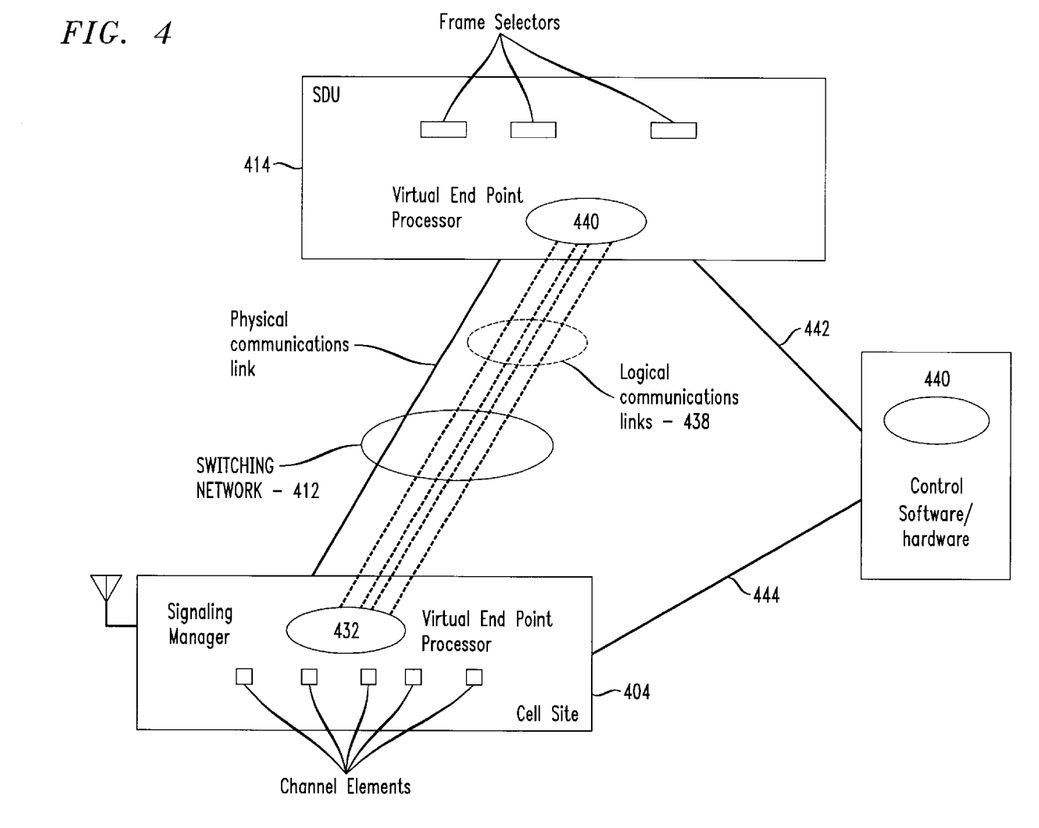
FIG. 4 shows an alternate embodiment of the network shown in FIG. 3.

FIG. 4 depicts an alternate embodiment of the network of FIG. 3 and shows a network (400) that includes a dedicated computer platform (440) and/or dedicated control software externally located from both the SDU (414) and the cell site (404) that controls the virtual end point processors (432, 440) via signaling links (442, 444). Such control software could pre-provision paths through a switching network (412) via switched virtual circuits (SVCs) or permanent virtual circuits (PVC) (438), not shown but known to those skilled in the art. Control software provisioning paths through the network could run in the computer supporting the base station controller functionality or some other computer.

Figure 5:
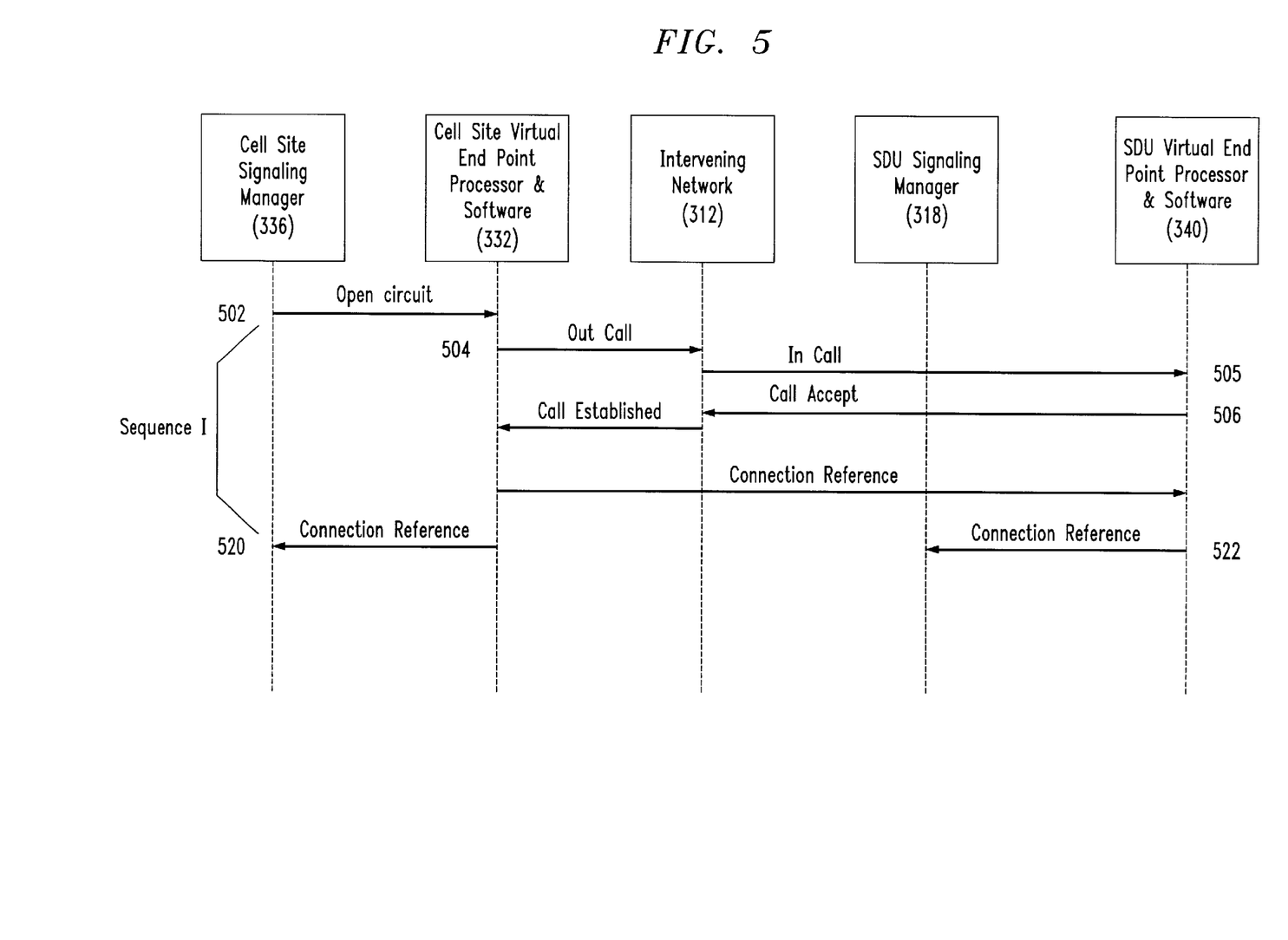
FIGS. 5 and 6 show the command flow in the network depicted in FIG. 3.

FIG. 5 depicts the program control flow used to set up a path between a cell site and SDU depicted in FIG. 3.

From the cell site signaling manager a cell site-internal Open Circuit message (502) is sent from the signaling manager (334) to the virtual end point processor (332) to open a circuit to the SDU (314). In instances where the signaling manager and the virtual end point processor are embodied within the same computer, the internal message (502) could consist of a program function call from one program module for example. In instances where the signaling manager and the virtual end point processor are different computers, the internal cell site message (502) could be an appropriate electrical signal from one computer to another, as those skilled in the art will recognize.

In response to the Open Circuit request message (502) the cell site virtual end point processor (332) sends an "Out Call" request message (504) to the intervening switching network (312) requesting a path through the network (312). As is known to those skilled in the art, the network transforms the Out Call request message (504) to the In Call request (505) to the SDU virtual end point processor (340) which in response produces a Call Accept message (506). When the intervening network (312) forwards the Call Accept message (506) to the cell site virtual end point processor (332) as a Call Established message (508) a call through the network (312) is established (508).

Upon the establishment of a call through the network (518) as set forth above, the cell site virtual end point processor (332) creates a Connection Reference Identifier (ID) Message (520) that is sent to the SDU virtual end point processor (340) and to the cell site signaling manager (334). The Connection Reference Identifier message (520) is used to identify the particular path established using the aforementioned sequence of messages. Within the SDU, the aforementioned Connection Reference Identifier message (522) is sent to the SDU signaling manager (318).

Figure 6:
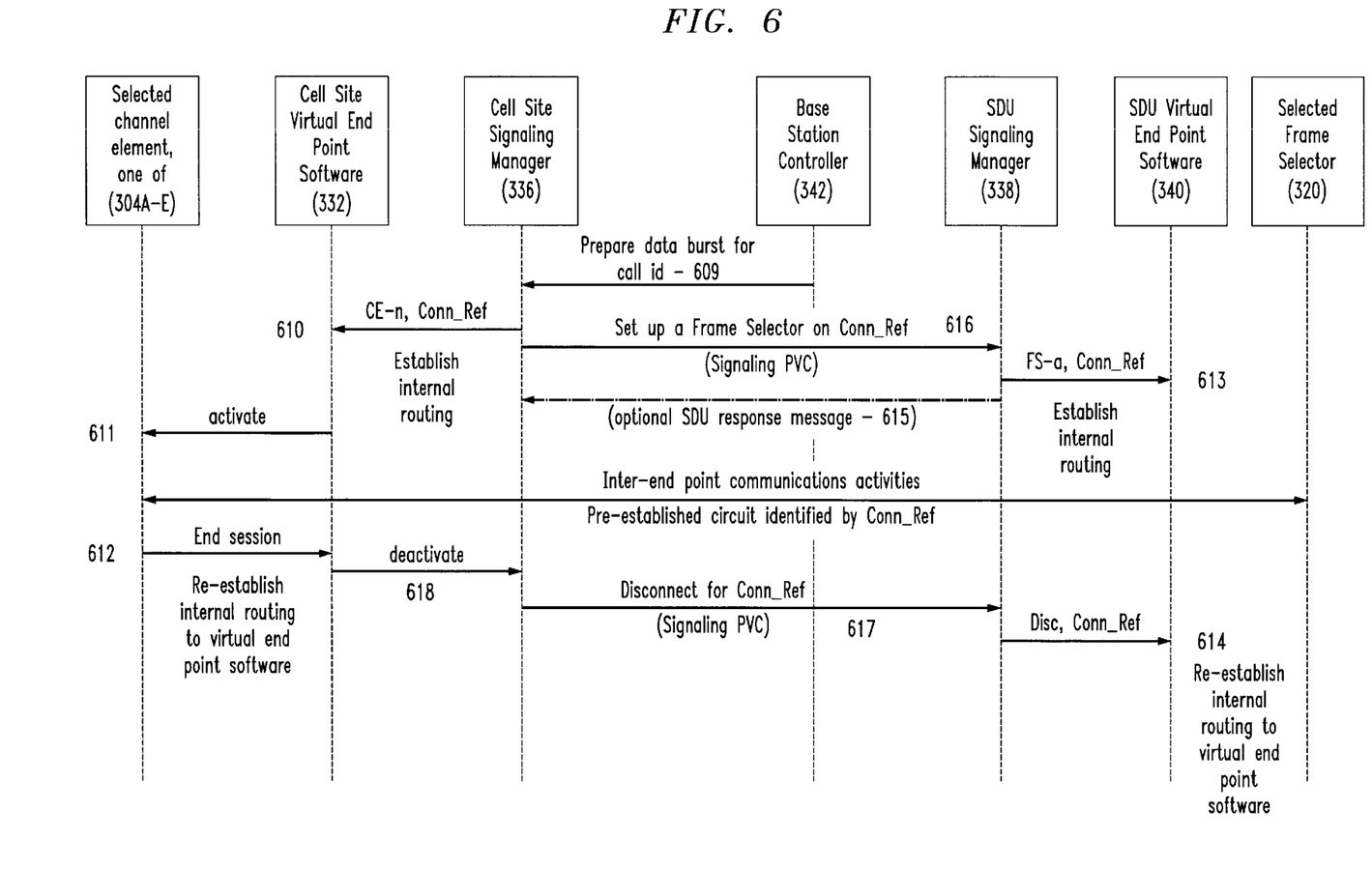

FIG. 6 shows the interactions among the base station controller, virtual end point processors and the signaling managers to manage the allocation of channel elements and frame selectors to serve a data burst for the duration of the burst only. When the burst ends, the channel element(s) and frame selectors are made available to serve another data call, and the previously established communications paths are made to terminate once again on the virtual end point processors.

The base station controller (321) sends a "prepare data burst message" (609) to the cell site signaling manager (334) specifying the call identification for the data burst. The cell site signaling manager (334) sends internal cell site message (610) to the cell site virtual end point processor (332) specifying a channel element to be allocated to the data burst and the reference (Conn_Ref) of the previously established communications path to be used. Use of such a previously established logical or virtual communications path through the virtual end point processors (or alternatively under the control of the virtual end point processors) to enhance high-speed data handling in a CDMA system is not shown or suggested in the prior art. The cell site signaling manager (334) simultaneously sends inter-component message (616) to the SDU signaling manager, asking that a frame selector be made available for the data burst, that the frame selector be associated with the communications path specified by the Conn_Ref parameter, and that the frame selector be associated also with the particular call instance in progress within the SDU, if such an association does not already exist. The SDU signaling manager communicates via internal message (613) to the SDU virtual end point processor that an allocated frame selector be associated with the communications path denoted by the Conn_Ref parameter. The SDU signaling manager (318) optionally sends an appropriate response message (615) to the cell site signaling manager (334) indicating compliance with the inter-component message (616).

On the SDU side, the SDU virtual end point processor arranges for routing within the SDU for the communications path to be to the selected frame selector (one of 314 A–F). On the cell site side, the cell site virtual end point processor arranges for routing within the cell site for the communications path to be to the selected channel element (one of 304 A–E). The cell site virtual end point processor sends internal message (611) to the allocated channel element to notify it that communications may begin. The allocated channel element and frame selector interact over the communications path denoted by the Conn_Ref until the burst of data is transferred. Such interaction might include synchronization of the communications paths prior to data burst transfers. When the burst duration expires, the channel element sends the internal message (612) to the cell site virtual end point processor to cause the de-allocation of resources.

Those skilled in the art will recognize and appreciate that while the preferred embodiment has been described with respect to an asynchronous transfer mode (ATM network, other switching networks would be useable as well. Furthermore, use of the invention is not necessarily limited to wireless communication networks but is contemplated with land-line networks as well.

Using the aforementioned virtual end point processors and signaling managers to pre-establish and maintain communication paths through a switching network between cell sites and other infrastructure equipment, set up time for a communication path is substantially reduced. Reduced set up time helps insure that high-speed data is not lost due to an unavailable transmission path between a CDMA subscriber and a data destination, and also helps ensure that high-quality packet data service is provided by the communication system.

What is claimed is:

1. A method comprising the steps of:

prior to a request for resources for a data call, establishing a communication path that terminates at a first virtual end point processor and at a second virtual end point processor;

indicating to a first signaling manager to provide a path set-up for the data call;

in a message to the first virtual end point processor, identifying, by the first signaling manager, the communication path and at least one channel element of a plurality of channel elements for the data call;

establishing, by the first virtual end point processor, a cell site path from the at least one channel element to the communication path;

in a message to a second signaling manager, identifying, by the first signaling manager, the communication path and requesting allocation of at least one frame selector of a plurality of frame selectors for the data call;

in a message to the second virtual end point processor, identifying, by the second signaling manager, the communication path and the at least one frame selector;

establishing, by the second virtual end point processor, a selector distribution unit path from the at least one frame selector to the communication path;

carrying out at least a part of the data call between the at least one channel element and the at least one frame selector.

2. The method of claim 1, wherein a composite signaling manager comprises the first signaling manager and the second signaling manager.

3. The method of claim 1, wherein the first signaling manager is a cell site signaling manager.

4. The method of claim 1, wherein the second signaling manager is a selector distribution unit signaling manager.

5. The method of claim 1, wherein at least a part of the data call takes place over a wireless communication network.

6. The method of claim 1, further comprising the steps of:

establishing a second communication path that terminates at a third virtual end point processor and at the second virtual end point processor;

in a message to the third virtual end point processor, identifying, by a third signaling manager, the second communication path and at least one second channel element of a second plurality of channel elements for the data call;

establishing, by the third virtual end point processor, a second cell site path from the at least one second channel element to the second communication path;

in a message to the virtual end point processor, identifying by the second signaling manager, the second communication path;

carrying out at a part of the data call between the at least one channel element, the at least one second channel element, and the at least one frame selector, wherein the at least one frame selector selects a best signal from the at least one channel element and the at least one second channel element.

7. The method of claim 1, wherein at least a part of the data call takes place over a wireless communication network.

8. A system comprising:

a first virtual end point processor operably coupled to a plurality of channel element;

a second virtual end point processor operably coupled to a plurality of frame selector;

at least one signaling manager, arranged and constructed to establish a communication path that terminates at least the first virtual end point processor and the second virtual end point processor prior to receiving a request for resources for a data call, such that set-up time for the data call through a wireless network is reduced.

9. The system of claim 8, wherein the communication path is established over an asynchronous transfer mode network.

10. The system of claim 8, wherein the at least one signaling manager comprises a cell site signaling manager and a selector distribution unit signaling manager.

11. The system of claim 8, wherein the at least one signaling manager is a dedicated control device that controls the first virtual end point processor and the second virtual end point processor.

12. The system of claim 8, wherein the at least one signaling manager is further arranged and constructed to, after receiving the request for resources for the data call, establish a path between the communication path and at least one of the plurality of channel elements and to establish a path between the communication path and at least one of the plurality of frame selectors.

13. The system of claim 8, further comprising:

a third virtual end point processor operably coupled to a second plurality of channel elements;

wherein the at least one signaling manager is operably coupled to the third virtual end point processor and is further arranged and constructed to establish a second communication path that terminates at the third virtual end point processor and the second virtual end point processor prior to receiving the request for resources for the data call, such that set-up time for the data call through the wireless network is reduced.

14. The system of claim 13, wherein the at least one signaling manager is further arranged and constructed to, after receiving the request for resources for the data call, establish a path between the second communication path and at least one of the second plurality of channel elements and to establish a path between the second communication path and at least one of the plurality of frame selectors.

15. The system of claim 13, wherein the at least one signaling manager comprises a first cell site signaling manager, a second cell site signaling manager, and a selector distribution unit signaling manager.

16. The system of claim 8, wherein the at least one signaling manager is further arranged and constructed to de-allocate the channel element and the frame selector after the data call is completed.

17. The system of claim 8, wherein the at least one signaling manager is further arranged and constructed to terminate the communication path at the first virtual end point processor and the second virtual end point processor after the data call is completed.

18. A method comprising the steps of:

establishing a communication path that terminates at a cell site virtual end point processor and at a selector distribution unit virtual end point processor;

indicating, by a base site controller, to a cell site signaling manager to provide a path set-up for a data call;

in a message to the cell site virtual end point processor, identifying, by the cell site signaling manager, the communication path and at least one channel element of a plurality of channel elements for the data call;

establishing, by the cell site virtual end point processor, a cell site path from the least one channel element to the communication path;

in a message to a selector distribution unit signaling manager, identifying, by the cell site signaling manager, the communication path and requesting allocation of at least one frame selector of a plurality of frame selectors for the data call;

in a message to the selector distribution unit virtual end point processor, identifying, by the selector distribution unit signaling manager, the communication path and the at least one frame selector;

establishing, by the selector distribution unit virtual end point processor, a selector distribution unit path from the at least one frame selector to the communication path;

carrying out at least a part of the data call between the at least one channel element and the at least one frame selector.

19. The method of claim 18, further comprising the step of de-allocating the channel element and the frame selector after the data call is completed.

20. The method of claim 18, further comprising the step of terminating the communication path at the cell site virtual end point processor and the selector distribution unit virtual end point processor after the data call is completed.

21. The method of claim 18, further comprising the steps of:

establishing a second communication path that terminates at a second cell site virtual end point processor and at the selector distribution unit virtual end point processor;

in a message to the second cell site virtual end point processor, identifying, by a second cell site signaling manager, the second communication path and at least one second channel element of a second plurality of channel elements for the data call;

establishing, by the second cell site virtual end point processor, a second cell site path from the least one second channel element to the second communication path;

in a message to the selector distribution unit virtual end point processor, identifying, by the selector distribution unit signaling manager, the second communication path;

establishing, by the selector distribution unit virtual end point processor, a selector distribution unit path from the at least one frame selector to the second communication path;

carrying out at least a part of the data call between the at least one channel element, the at least one second channel element, and the at least one frame selector, wherein the at least one frame selector selects a best signal from the at least one channel element and the at least one second channel element.

* * * * *